United States Patent
Gbadegesin et al.

(10) Patent No.: US 8,418,222 B2
(45) Date of Patent: Apr. 9, 2013

(54) FLEXIBLE SCALABLE APPLICATION AUTHORIZATION FOR CLOUD COMPUTING ENVIRONMENTS

(75) Inventors: Abolade Gbadegesin, Seattle, WA (US); Roman Batoukov, Sammamish, WA (US); David R. Reed, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1048 days.

(21) Appl. No.: 12/241,710

(22) Filed: Sep. 30, 2008

(65) Prior Publication Data

US 2009/0228967 A1 Sep. 10, 2009

Related U.S. Application Data

(63) Continuation-in-part of application No. 12/042,637, filed on May 5, 2008, now Pat. No. 8,196,175.

(51) Int. Cl.
*G06F 17/00* (2006.01)

(52) U.S. Cl. .......................................................... 726/1

(58) Field of Classification Search .................. 709/255, 709/229
See application file for complete search history.

(56) References Cited

U.S. PATENT DOCUMENTS

| | | | |
|---|---|---|---|
| 5,517,569 A * | 5/1996 | Clark ............................... | 380/52 |
| 5,560,008 A | 9/1996 | Johnson et al. | |
| 5,999,711 A | 12/1999 | Misra et al. | |
| 6,725,376 B1 | 4/2004 | Sasmazel et al. | |
| 6,892,307 B1 | 5/2005 | Wood et al. | |
| 7,073,174 B2 | 7/2006 | Volkoff et al. | |
| 7,114,076 B2 * | 9/2006 | Callaghan ..................... | 713/182 |
| 7,178,163 B2 | 2/2007 | Reeves, Jr. | |
| 7,185,364 B2 * | 2/2007 | Knouse et al. .................... | 726/8 |
| 7,234,157 B2 | 6/2007 | Childs et al. | |
| 7,243,369 B2 * | 7/2007 | Bhat et al. ......................... | 726/6 |
| 7,353,281 B2 * | 4/2008 | New et al. ..................... | 709/229 |
| 7,673,135 B2 * | 3/2010 | Chin et al. .................... | 713/159 |

(Continued)

OTHER PUBLICATIONS

Tang, Jian, "Integrate Tivoli Access Manager with ObjectGrid to Authenticate and Authorize your Distributed Clients", Retrieved at <<http://www.ibm.com/developerworks/websphere/techjournal/0801_tang/0801_tang.html>>, Jan. 23, 2008, pp. 11.

(Continued)

*Primary Examiner* — Kambiz Zand
*Assistant Examiner* — Abiy Getachew
(74) *Attorney, Agent, or Firm* — Chin IP, PLLC; Davin Chin

(57) ABSTRACT

A representational state transfer-based model for a computing environment uses models resources with links between them. Security principals are resources which can be independently authenticated. Each resource may be associated with an authorization policy that determines level of access, protocol supported. Successfully presenting security credentials at a security principal allows use of an instance of the security principal (i.e. application) as well as generation of an authentication token that can be presented across the computing environment to resources subscribing to the same authorization policy. As security principals with different security policies are authenticated, the appropriate tokens may be combined to allow broader access without undue re-authentication for resources subscribing to the same security policy. Authorization requirements (policies) may be attached to links to resources so that an application instance can dynamically discover authentication rules for that resource by inspecting the link.

20 Claims, 3 Drawing Sheets

U.S. PATENT DOCUMENTS

| | | | |
|---|---|---|---|
| 8,181,250 B2* | 5/2012 | Rafalovich et al. | 726/23 |
| 2002/0147929 A1 | 10/2002 | Rose | |
| 2002/0165960 A1* | 11/2002 | Chan | 709/225 |
| 2004/0003081 A1 | 1/2004 | Justus et al. | |
| 2004/0010603 A1 | 1/2004 | Foster et al. | |
| 2004/0139319 A1 | 7/2004 | Favazza et al. | |
| 2005/0193211 A1* | 9/2005 | Kurose | 713/185 |
| 2005/0256878 A1 | 11/2005 | Brown et al. | |
| 2006/0230430 A1 | 10/2006 | Hondo et al. | |
| 2006/0239540 A1* | 10/2006 | Serra et al. | 382/154 |
| 2007/0044146 A1 | 2/2007 | Murase et al. | |
| 2007/0100967 A1 | 5/2007 | Smith et al. | |
| 2007/0107048 A1 | 5/2007 | Halls et al. | |
| 2007/0143829 A1 | 6/2007 | Hinton et al. | |
| 2007/0204166 A1 | 8/2007 | Tome et al. | |
| 2007/0260875 A1 | 11/2007 | Raghunath et al. | |
| 2007/0294404 A1 | 12/2007 | Boutboul | |
| 2008/0083031 A1 | 4/2008 | Meijer et al. | |
| 2008/0148351 A1 | 6/2008 | Bhatia et al. | |

OTHER PUBLICATIONS

"Cloudware—Cloud Computing without Compromise", Retrieved at <<http://www.3tera.com/Cloud-computing/>>, Jul. 17, 2008, pp. 3.

Kagal, et al., "Self-describing Delegation Networks for the Web", Retrieved at <<http://people.csail.mit.edu/kagal/papers/kagal-delegation.pdf>>, pp. 10.

Ford, et al., "Alpaca: Extensible Authorization for Distributed Services", Retrieved at <<http://pdos.csail.mit.edu/papers/alpaca-ccs07.pdf>>, CCS'07, Oct. 29-Nov. 2, 2007, Alexandria, pp. 13.

Singh, et al., "A Privacy, Trust and Policy based Authorization Framework for Services in Distributed Environments", Retrieved at <<http://www.waset.org/ijcs/v2/v2-2-11.pdf>>, International Journal of Computer Science vol. 2 No. 2, pp. 85-92.

Tang, J. "Integrate Tivoli Access Manager with ObjectGrid to Authenticate and Authorize your Distributed Clients," Jan. 2008, http://www.ibm.com/developerworks/websphere/techjournal/0801_tang/0801_tang.html.

"Cloudware—Cloud Computing without Compromise," 3tera, Inc. 2008, , http://www.3tera.com/Cloud-computing/.

Kagal et al., "Self-describing Delegation Networks for the Web," http://people.csail.mitedu/lkagal/papers/kagal-delegation.ed.

Lesniewski-Laas et al., "Alpaca: Extensible Authorization for Distributed Services," http://pdos.csail.mit.edu/papers/alpaca-ccs07.pdf.

Singh et al., "A Privacy, Trust and Policy based Authorization Framework for Services in Distributed Environments," http://www.waset.org/ijcs/v2/v2-2-11.pdf.

Arnab et al. "Ticket Based Identity System for DRM" , Department of Computer Science, University of Cape Town Rondebosch, South Africa 2006, pp. 1-10.

Park et al. "A Ticket-Based AAA Security Mechanism in Mobile IP Network", Department of Computer Science and Engineering, Ewha Womans University, Seoul, Korea, vol. 2668, 2003, pp. 210-219.

Uzquiano et al., "Secure Applications in Multi-Domain Environment: Secure Desktop" Department of Computer and System Sciences, Stockholm, Mar. 7, pp. 1-57.

* cited by examiner

FLEXIBLE SCALABLE APPLICATION AUTHORIZATION FOR CLOUD COMPUTING ENVIRONMENTS

RELATED APPLICATION

This application is a continuation-in-part of co-pending U.S. patent application Ser. No. 12/042,637, filed Mar. 5, 2008 now U.S. Pat. No. 8,196,175, the entire disclosure of which is hereby incorporated by reference for all purposes.

BACKGROUND

The success of the Web and email may be due to their scalability and interoperability. In part, such scalability and interoperability are enabled by standardized message formats, protocols, and addressing schemes. The Web in particular takes advantage of URI (universal resource identifier) addressing to find endpoints. Traditionally, endpoints were software components supporting remote procedure calls. However, a new model for network-based computing uses a representational state transfer (REST) paradigm. In the REST paradigm, sources of specific information are called resources and are identified, typically, by a URI. A connector can mediate the requests made for resources. Servers, caches, tunnels, etc., are all examples of connectors. Each may make or forward a request without explicit knowledge of where the actual resource may be.

Resources may be owned by one entity, hosted by another entity, and support connectors may be from virtually anywhere. Varying requirements for security resulting from this variety may prevent transparent operation of such a mesh of resources, because different participants may have different requirements for security. In addition, not all participants may support the same security processes and protocols.

For example, one resource owner may require public key authentication and support only elliptic curve key types. However, a requester attempting to use that resource may support only RSA key types. Further, the requester may have to traverse a network that requires an SSL2 secure communication protocol for transport sercurity while another path may not.

SUMMARY

A computing environment, including both client and cloud computing entities, may be modeled as resources with relationships between them modeled as links. An authenticatable entity is modeled as a security principal. When a security principal, for example, a user, device, or application, issues a request against a resource, the cloud may invoke an authentication engine to examine an authentication policy or policies in place for that resource. The security principal's credentials may be examined with respect to the authentication policy or policies, and, if found acceptable, the authentication engine may grant access to the resource and issue an authentication token for use by an instance of the resource to use in related requests to other resources. The authentication token may also be used to allow the security principal, for example, a user, more elevated access to the resource (e.g. granting admin rights).

Any links to the resource may also include authorization token links so that an application instance can discover any authorization requirements by inspecting all resource links for authorization token links.

More than one authentication policy may be associated with a resource. For example, a resource may have a policy associated with the resource owner as well as the resource host. A policy may describe requirements for use of the resource, requirements for access to the resource (e.g. administrative access), security protocols supported by the resource, etc. The policy may also include operational rules, for example, that one CPU is granted per authorization.

As described in the above-referenced related application, a combination of resource caching and resource synchronization may allow the use of the authentication scheme by both client-based applications and cloud-based applications or services.

DETAILED DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
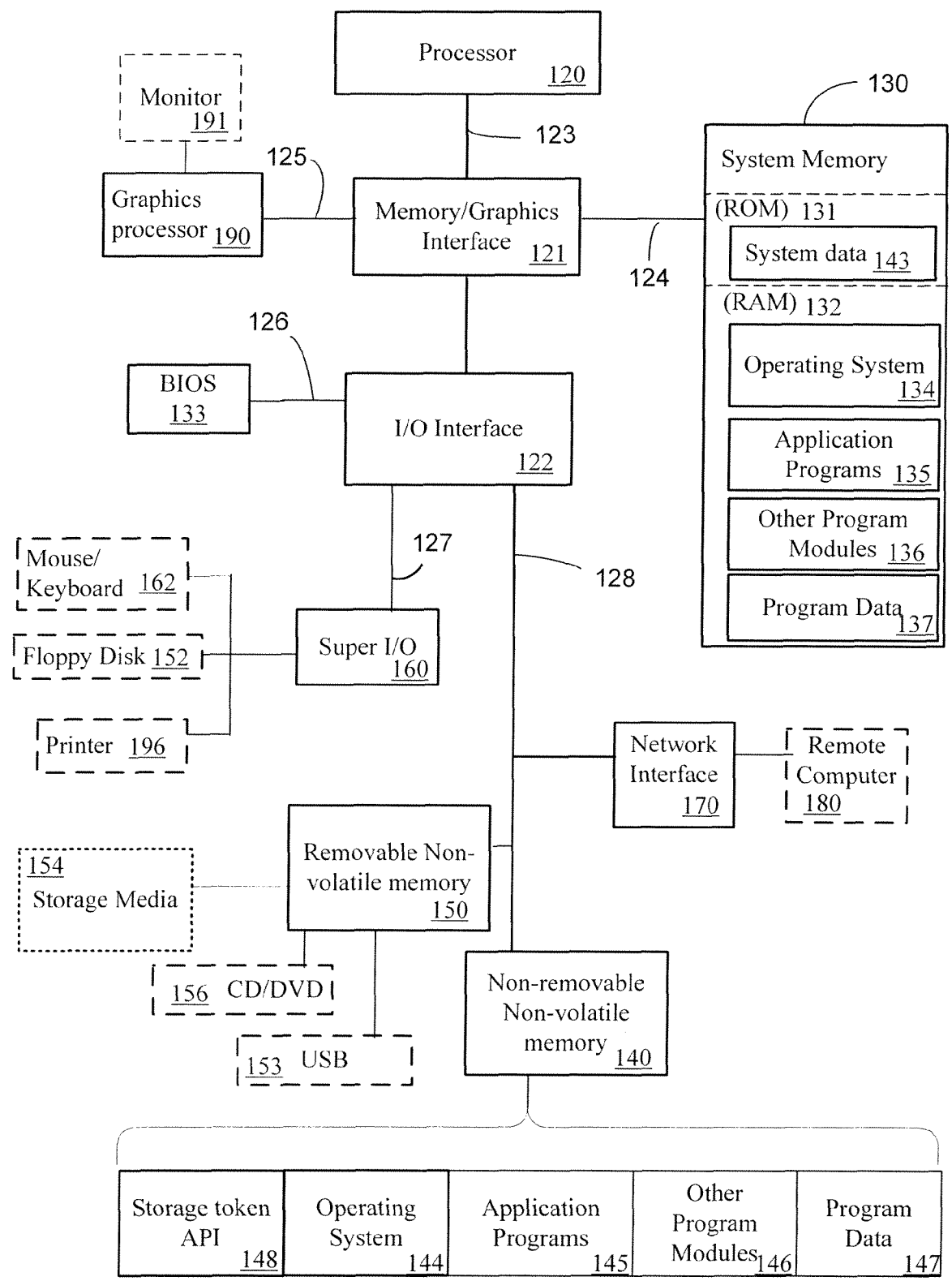
FIG. 1 illustrates a example of a computer capable of supporting operations in a cloud computing environment.

With reference to FIG. 1, an exemplary system for implementing the claimed method and apparatus includes a general purpose computing device in the form of a computer 110. Components shown in dashed outline are not technically part of the computer 110, but are used to illustrate the exemplary embodiment of FIG. 1. Components of computer 110 may include, but are not limited to, a processor 120, a system memory 130, a memory/graphics interface 121, also known as a Northbridge chip, and an I/O interface 122, also known as a Southbridge chip. The system memory 130 and a graphics processor 190 may be coupled to the memory/graphics interface 121. A monitor 191 or other graphic output device may be coupled to the graphics processor 190.

A series of system busses may couple various system components including a high speed system bus 123 between the processor 120, the memory/graphics interface 121 and the I/O interface 122, a front-side bus 124 between the memory/graphics interface 121 and the system memory 130, and an advanced graphics processing (AGP) bus 125 between the memory/graphics interface 121 and the graphics processor 190. The system bus 123 may be any of several types of bus structures including, by way of example, and not limitation, such architectures include Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport™ architecture, respectively.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110.

The system memory 130 includes computer storage media in the form of volatile and/or nonvolatile memory such as read only memory (ROM) 131 and random access memory (RAM) 132. The system ROM 131 may contain permanent system data 143, such as identifying and manufacturing information. In some embodiments, a basic input/output system (BIOS) may also be stored in system ROM 131. RAM 132 typically contains data and/or program modules that are immediately accessible to and/or presently being operated on by processor 120. By way of example, and not limitation, FIG. 1 illustrates operating system 134, application programs 135, other program modules 136, and program data 137.

The I/O interface 122 may couple the system bus 123 with a number of other busses 126, 127 and 128 that couple a variety of internal and external devices to the computer 110. A serial peripheral interface (SPI) bus 126 may connect to a basic input/output system (BIOS) memory 133 containing the basic routines that help to transfer information between elements within computer 110, such as during start-up.

A super input/output chip 160 may be used to connect to a number of 'legacy' peripherals, such as floppy disk 152, keyboard/mouse 162, and printer 196, as examples. The super I/O chip 160 may be connected to the I/O interface 122 with a bus 127, such as a low pin count (LPC) bus, in some embodiments. Various embodiments of the super I/O chip 160 are widely available in the commercial marketplace.

In one embodiment, bus 128 may be a Peripheral Component Interconnect (PCI) bus, or a variation thereof, may be used to connect higher speed peripherals to the I/O interface 122. A PCI bus may also be known as a Mezzanine bus. Variations of the PCI bus include the Peripheral Component Interconnect-Express (PCI-E) and the Peripheral Component Interconnect-Extended (PCI-X) busses, the former having a serial interface and the latter being a backward compatible parallel interface. In other embodiments, bus 128 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 1 illustrates a hard disk drive 140 that reads from or writes to non-removable, nonvolatile magnetic media. The hard disk drive 140 may be a conventional hard disk drive.

Removable media, such as a universal serial bus (USB) memory 153, firewire (IEEE 1394), or CD/DVD drive 156 may be connected to the PCI bus 128 directly or through an interface 150. A storage media 154 may coupled through interface 150. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 1, provide storage of computer readable instructions, data structures, program modules and other data for the computer 110. In FIG. 1, for example, hard disk drive 140 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a mouse/keyboard 162 or other input device combination. Other input devices (not shown) may include a microphone, joystick, game pad, satellite dish, scanner, or the like. These and other input devices are often connected to the processor 120 through one of the I/O interface busses, such as the SPI 126, the LPC 127, or the PCI 128, but other busses may be used. In some embodiments, other devices may be coupled to parallel ports, infrared interfaces, game ports, and the like (not depicted), via the super I/O chip 160.

The computer 110 may operate in a networked environment using logical connections to one or more remote computers, such as a remote computer 180 via a network interface controller (NIC) 170. The remote computer 180 may be a personal computer, a server, a router, a network PC, a peer device or other common network node, and typically includes many or all of the elements described above relative to the computer 110. The logical connection between the NIC 170 and the remote computer 180 depicted in FIG. 1 may include a local area network (LAN), a wide area network (WAN), or both, but may also include other networks. Such networking environments are commonplace in offices, enterprise-wide computer networks, intranets, and the Internet. The remote computer 180 may also represent a web server supporting interactive sessions with the computer 110, or in the specific case of location-based applications may be a location server or an application server.

In some embodiments, the network interface may use a modem (not depicted) when a broadband connection is not available or is not used. It will be appreciated that the network connection shown is exemplary and other means of establishing a communications link between the computers may be used.

Figure 2:
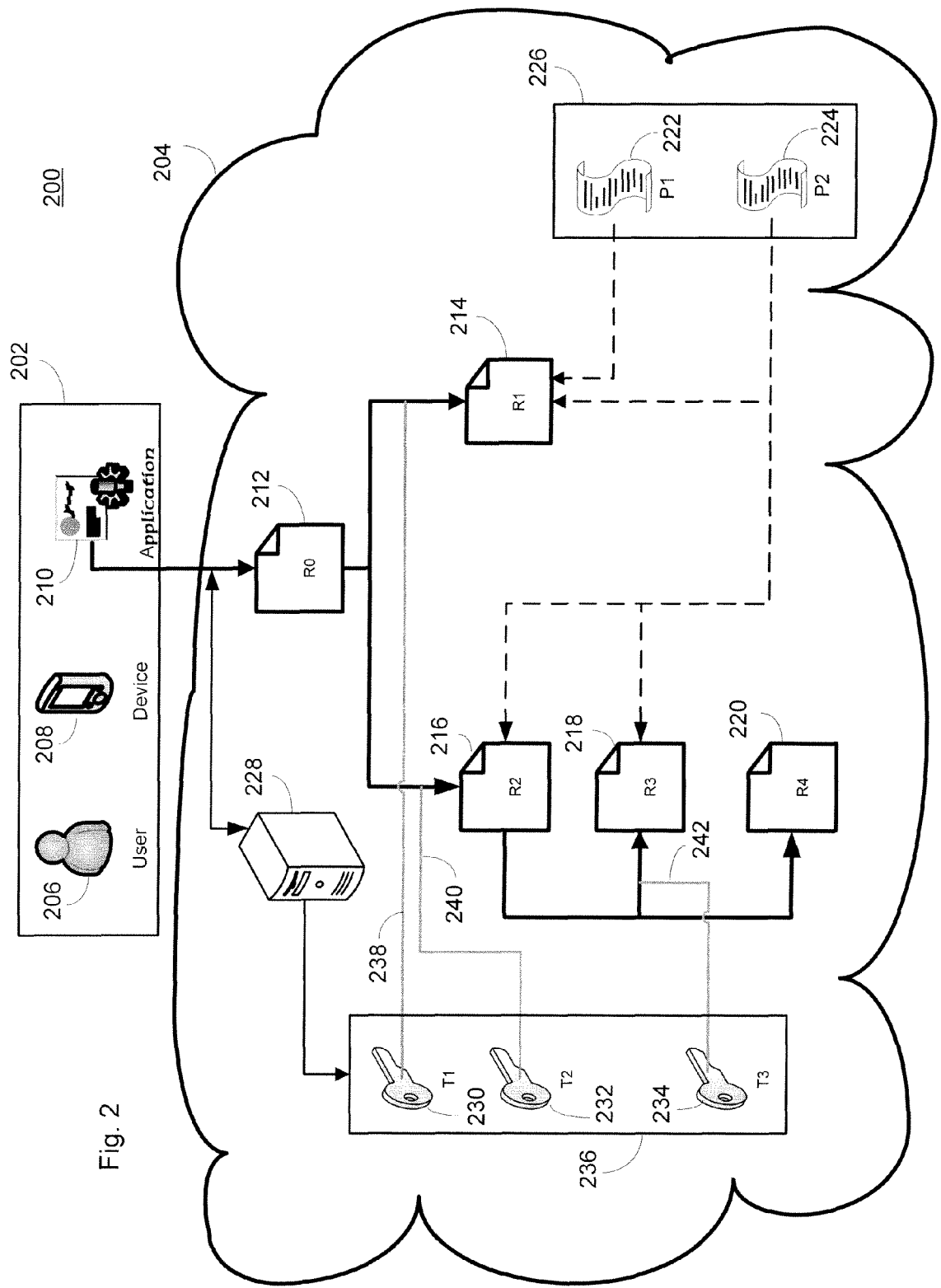
FIG. 2 illustrates a cloud computing environment supporting flexible scalable application authorization.

FIG. 2 illustrates a computing environment 200 including a client entity 202 and a computing cloud 204. As described in the related application noted above, a ticketing system adapted for use with a cloud-based services platform is provided by a ticket-based authorization model in which the authorization requirements for traversing a mesh of resources associated with a cloud service are annotated in the links used by resources to refer to other resources. The meshes are thus self-describing with respect to the association (i.e., the links) between resources as well as the authorization required to access resources. Resource access employs a principal ticket which asserts that a caller at a client (e.g., a security principal representing a device or identity associated with a user) is authenticated, plus zero or more claim tickets. The claim tickets make additional assertions about the caller that the cloud service may use to check to determine that the caller is authorized to access the resource. The principal and claim tickets are signed so that their authenticity may be checked by the cloud service.

When a resource in a mesh requires a claim ticket for access, the requirement is expressed by including a URI (Universal Resource Identifier) that identifies where the claim ticket may be retrieved as an attribute on links to that resource. Optionally, a resource link may be arranged to include an inline value of the required claim ticket as an attribute which eliminates the extra step of retrieving the required claim ticket. By associating links to the resources with the authorization requirements for accessing the resources, a client can traverse a mesh and access its resources while obtaining the required claim tickets along the way.

As illustrated in FIG. 2, the client entity 202 may include one or more of a user 206, a device 208, an application 210, etc. One feature of the elements of the client entity 202 is that each is authenticable.

The cloud-based services platform, or simply, the computing cloud 204, may include a number of resources that are navigable by links or references. For example, in FIG. 2, resources include R0 212, R1 214, R2 216, R3 218, and R4 220.

The resources may each have an associated security policy P1 222, P2 224, or more (not depicted). The security policies may be stored in a policy repository 226. Each security policy 222, 224, etc. may be related to a party with an interest in the resource. For example, a first security policy P1 222 may specify access criteria specified by an owner of the resource used to limit what users may access the resource. Additional first security policy P1 criteria may describe what credentials must be presented for higher level, e.g. administrator, access to the resource. The first security policy P1 222 may also include additional access criteria, protocols, cryptographic algorithms, key lengths, etc.

A second security policy P2 224, may represent the interests of a host of the resource, for example, specifying required authentication protocols, such as RSA public key over an SSL2 transport. As with the first security policy P1, the second security policy P2 may also specify additional access conditions, protocols, cryptographic algorithms, key lengths, etc.

As depicted in FIG. 2, a resource may be associated with one or more security policies, or in the case of resource R4 220, may not have any security policy.

An authentication engine 228 may handle requests made for access to a resource, for example, a request from application 210 for access to resource R0 212. The request may include the security credentials of the application 210, such as a ID/password or signed challenge response. In one embodiment, the request uses an HTTP protocol with an authentication header and token.

The authentication engine 228 may examine the credentials and evaluate them in view of the appropriate security policies that may be in place for the selected resource. When the security policy is met by the credential, one or more authorization tokens T1 230, T2 232, or T3 234 may be generated. The tokens 230, 232, 234, etc. may be stored in a token repository 236.

Additionally, authorization token links 238, 240, and 242 may be attached to relevant links so that in traversing links to resources, an application instance may find a link to the token repository 236, or other resource, from which the authorization token may be retrieved upon successfully satisfying the associated authentication requirements. It is therefore possible to dynamically discover any authorization requirements by inspecting all resource links to detect the presence of authorization token links. In this fashion, authorization rules for the computing environment are self-describing.

In operation, the security principal 202, be it a user with a LiveID credential, a first or third party application 210, such as a code function or gadget, may request services from the computing cloud 204. The request and credentials may be passed to a resource 212 and the credentials and related security policy verified at the authentication engine 228.

The authentication engine 228 may generate one or more tokens 230, 232, 234. Should the resource 212 need to make subsequent calls to additional resources, e.g. R1 or R2, 214 or 216, respectively, the links to the resources may be examined for authorization token links 238 and 240 to determine the appropriate security requirements and to retrieve the previously generated tokens if required. When the representation returned for R0 212 contains links to resources R2 216 and R1 214, each link is annotated with an authorization token link as a link attribute. The authorization token link for R1 214 refers to T1 230 and the authorization token link for R2 216 refers to T2 232.

Before issuing a request to interact with resource R1 214, the client must first issue a request to T1 to obtain an authorization token. The authorization engine may generate the requested authorization token on demand, based on the security credentials provided by the client.

As more resources are traversed, the client can build up a dictionary of entries for each resource link, remembering which authorization tokens were needed in order to interact with that resource. This reduces the need to repeatedly obtain authorization tokens for resources that it interacts with multiple times.

This process allows abstraction of security policies, authentication, and resource traversal, reducing overhead in both storage of policies and tokens, and of computing power used to repetitively validate credentials. Further, because the authorization rules are self describing, additional overhead to maintain databases of security status and pointers are eliminated. This abstraction applies to both first and third party security principals whether inside or outside the computing cloud 204.

Figure 3:
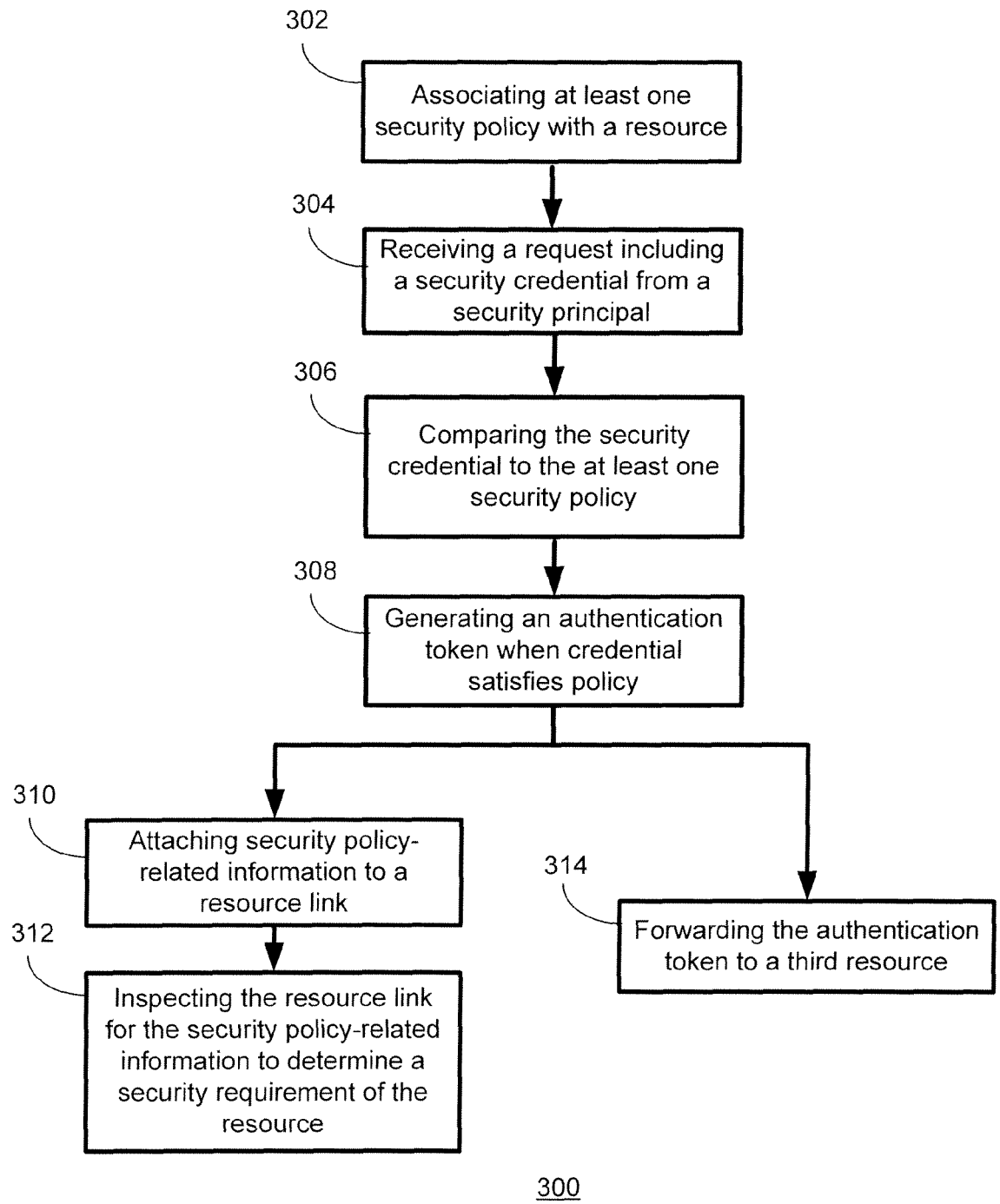
FIG. 3 illustrates a method of performing flexible scalable application authorization.

FIG. 3 illustrates a method 300 of performing application authentication in a cloud computing environment, for example, the cloud computing environment 200 of FIG. 2. The cloud computing environment 200 may include a plurality of resources that may be exposed to a requesting entity. One or more security principals, i.e. authenticatable entities, may be associated with the cloud computing environment 200 and may request access to or services from one or more of the resources. Internal to the cloud computing environment 200, one resource may request access to or services from another resource. At block 302, a security policy 222 may be created and associated with at least one resource. More than one security policy may be generated and more than one security policy may be associated with a single resource.

The security policy 222 may specify a credential requirement for use of the resource or for access to the resource. That is, one level of credential may allow use of a program or gadget, while another credential may allow the requester to access the resource, for example, as an administrator to perform a maintenance function. The security policy 222 may specify a cryptographic policy, such as requiring the use of 3DES or RSA public keys and/or a minimum key strength. One security policy applied to a resource may be associated with a first entity having an interest in the resource, for example an owner of the resource. Another security policy applied to the same resource may be associated with a second entity having an interest in the resource, such as a host of the resource. Other parties with an interest in the resource who may also contribute to additional security policies may include an author, a security monitor, an auditor, etc.

In one embodiment, a set of standard policies may be developed and stored that may be associated with one or more resources. The use of standard policies can minimize the risk of a missed criteria as well as create a more uniform security environment.

At block 304 the cloud computing environment 200 may receive a request from a security principal to access a resource. The request may include a security credential of the security principal. When receiving the request for access, the cloud computing environment 200 may route the request to an authentication engine 228 instead of or in addition to routing the request to the correct resource.

At block 306, the authentication engine 228 may determine which, if any, security policies may be applicable to the requested resource. The authentication engine 228 may then determine whether the credentials presented satisfy the requirements of the security policy 226. If the credentials do not satisfy the requirements, the process ends. Assuming the credentials meet the requirements of the security policy 222, e.g. both the protocol and key data requirements of the security policy, execution may continue.

At block 308, the authorization engine 228 may generate an authorization token 230 when the security credential satisfies the at least one security policy 222. The authorization engine 228 may generate a token for the requested resource. The authentication engine 228 may generate a token for each security policy in the mesh for which the supplied credential satisfies its requirements. The one or more authorization tokens may be stored in a token repository 236. Alternatively, as a link is traversed, the policy may be discovered and a token generated. In either case, the authentication engine 228 may generate a separate authentication token for each security policy successfully authenticated.

At block 310, security policy-related information may be attached to a resource link used to traverse to the resource. The security policy-related information may correspond to the one or more security policies attached to the resource. The security policy-related information may be an authorization token link 238 identifying a second resource from which the authorization token is retrievable.

At block 312, security policy information attached to the resource link, e.g. an authorization token link 238, may be inspected to determine a security requirement for the resource. In this manner, even as the resources are realigned in the mesh, the security requirements are self-describing.

Returning to block 314, after one or more authentication tokens are generated, the resource may forward an authentication token from an instance of the resource, that is, a specific incarnation of the resource related to operation related to the request, to another resource. Such use of authentication tokens eliminates the need for successive authentication each time an entity is accessed related to the first request.

We claim:

1. One or more computer-readable media, not comprising a propagated signal, containing programmed instructions which, when executed by one or more processors disposed in an electronic device, perform a method of authorizing use of a resource in a cloud computing environment comprising: associating at least one security policy with the resource; receiving a request from a security principal to access the resource, the request including a security credential of the security principal; comparing the security credential to the at least one security policy associated with the resource; generating an authorization token when the security credential satisfies the at least one security policy; and attaching security policy-related information to a resource link used to traverse to the resource to annotate the resource link such that the security policy-related information annotating the resource link is able to be inspected to determine the security policy associated with the resource, the security policy-related information corresponding to the at least one security policy.

2. The one or more computer-readable media of claim 1, wherein the security policy-related information is an authorization token link identifying a second resource from which the authorization token is retrievable.

3. The one or more computer-readable media of claim 1, further comprising:
   forwarding the authorization token from an instance of the resource to a third resource.

4. The one or more computer-readable media of claim 1, further comprising:
   inspecting the resource link for the security policy-related information to determine a security requirement of the resource.

5. The one or more computer-readable media of claim 1, wherein the at least one security policy specifies a credential requirement for use of the resource.

6. The one or more computer-readable media of claim 1, wherein at least one security policy specifies a credential requirement for access to the resource.

7. The one or more computer-readable media of claim 1, wherein the at least one security policy specifies a cryptographic policy.

8. The one or more computer-readable media of claim 1, wherein the at least one security policy comprises a first security policy associated with a first entity associated with the resource and a second security policy associated with a second entity associated with the resource.

9. The one or more computer-readable media of claim 1, wherein receiving the request for access to the resource comprises receiving the request for access to the resource at an authentication engine.

10. The one or more computer-readable media of claim 9, wherein generating the authorization token comprises generating the authorization token at the authentication engine.

11. The one or more computer-readable media of claim 1, further comprising:
    developing a set of standard policies that may be associated with the resource.

12. The one or more computer-readable media of claim 1, wherein generating the authorization token when the security credential satisfies the at least one security policy comprises: generating a separate authentication token for each security policy successfully authenticated.

13. A computing environment comprising:
    a computing cloud including a plurality of resources accessible via links;

at least one client entity coupled to the computing cloud of computing resources that requests access to a resource of the plurality of resources;

an authentication engine that evaluates a security policy associated with the resource of the plurality of resources and generates an authorization token when a client entity security data satisfies the security policy for the resource, wherein an authorization token link is attached to each link used to access the resource;

a policy repository in the computing cloud for storing one or more of the security policies related to authentication and authorization of the resource; and a token repository in the computing cloud for storing the authorization token generated by the authentication engine.

14. The computing environment of claim 13, wherein the security policy defines a security protocol supported by the resource.

15. The computing environment of claim 13, wherein the security policy defines a credential that must be presented by the at least one client entity.

16. The computing environment of claim 13, wherein access to the resource comprises one of use of an application and access to a control of the application.

17. The computing environment of claim 13, wherein a plurality of authorization token links are attached to each link used to access the resource.

18. A method, operating as one or more processes or sub-processes programmed for execution on a computing platform, of accessing a resource in a cloud computing environment, the method comprising:

receiving, in a first of the one or more processes or sub-processes, a request from a security principal requesting access to the resource, the request including a security credential;

presenting, in a second of the one or more processes or sub-processes, the security credential to an authentication engine;

issuing, in a third of the one or more processes or sub-processes, a first authorization token granting access to the resource;

issuing, in a fourth of the one or more processes or sub-processes, a second authorization token related to the resource;

storing, in a fifth of the one or more processes or sub-processes, the first and second authorization tokens in a token repository; and attaching, in a sixth of the one or more processes or sub-processes, an authorization token link that points to the token repository to a link pointing to the resource.

19. The method of claim 18, wherein issuing the second authorization token comprises issuing the second authorization token granting additional rights to an instance of the resource associated with the request.

20. The method of claim 18, wherein issuing the second authorization token comprises issuing the second authorization token granting additional privileges to security principal related to access to the resource.

* * * * *